July 6, 1926.

H. J. SMITH 1,591,063

FLEXIBLE COUPLING

Filed August 12, 1924

Inventor
Harry J. Smith
By Popp & Powers
Attys

Patented July 6, 1926.

UNITED STATES PATENT OFFICE.

HARRY J. SMITH, OF LAKEWOOD, OHIO.

FLEXIBLE COUPLING.

Application filed August 12, 1924. Serial No. 731,573.

This invention relates to a flexible coupling which is adapted to connect adjacent parts of two rotatable members, such as two shafts, and permit of power being transmitted from one of these shafts to the other without shock, straining or cramping the parts or producing undue friction or loss of power.

It is the object of this invention to produce a flexible coupling of this character which is comparatively simple and durable in construction, efficient anl reliable in operation and capable of being readily assembled or dismembered.

In the accompanying drawings.

Similar characters of reference indicate like parts in the several views.

Figure 1:
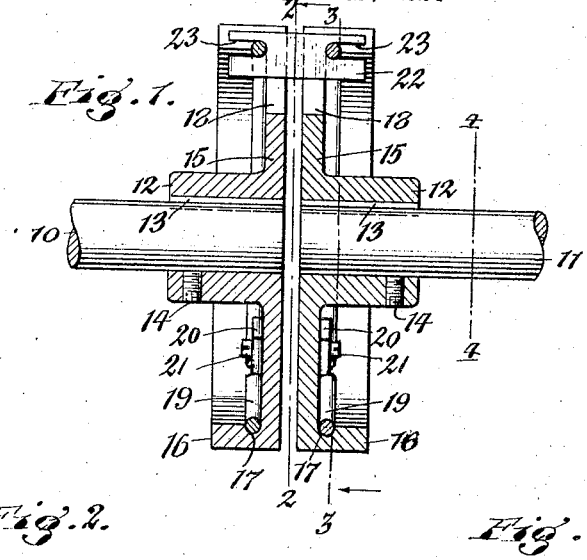
Figure 1 is a longitudinal section of a flexible coupling embodying my invention.

Although this flexible coupling may be utilized for connecting adjacent rotatable members of various kinds, the same is shown in the drawings for connecting two shafts 10 and 11 which are arranged end to end. My improved coupling is adapted to connect these two shafts and permit of transmitting motion from one to the other yieldingly and without binding or cramping or undue friction notwithstanding that these two shafts may be slightly out of alignment relatively to each other.

The particular embodiment of my invention which is shown in the drawings as applied to the opposing ends of these shafts is constructed as follows:

Mounted on the end of each of these shafts so as to turn therewith is a coupling head which comprises a tubular hub 12 which is secured to the respective shaft by means of a key 13 and a set screw 14, a transverse web or disk 15 extending outwardly from the front end of the hub 12, and an annular flange or rim 16 arranged on the rear side of the marginal part of the disk. On the inner side of the flange 16 and adjacent to the rear side of the disk the same is provided with an annular groove 17 which forms an inwardly facing or opening seat. At different points in its marginal part the coupling head is provided with a plurality of radial slots 18 each of which extends from the periphery thereof inwardly into the disk and across the flange thereon, four of such slots being preferably employed and arranged equidistant around the axis of the coupling head.

In the annular seat of each coupling head is arranged a retaining ring 19 which is split and preferably constructed of resilient material. Preparatory to placing this ring in its seat the same is first contracted sufficiently to pass along the inner side of the flange 16 until it is in line with the seat and upon reaching this place the ring may be expanded so as to enter the seat.

For the purpose of holding the retaining ring in engagement with the seat on the coupling head a locking device is provided which preferably consists of a locking block or keeper 20 which is inserted between the ends of the split part of the retaining ring while the same is expanded into the seat, and a screw 21 whereby this block is detachably fastened to the rear side of the disk of the respective coupling head.

Figure 2:
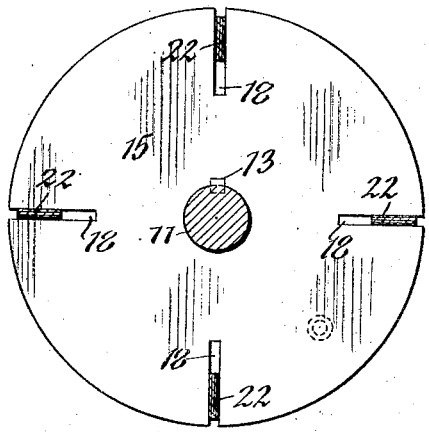
Figures 2, 3 and 4 are transverse sections of the same taken on the correspondingly numbered lines in Figure 1.
Figure 3:
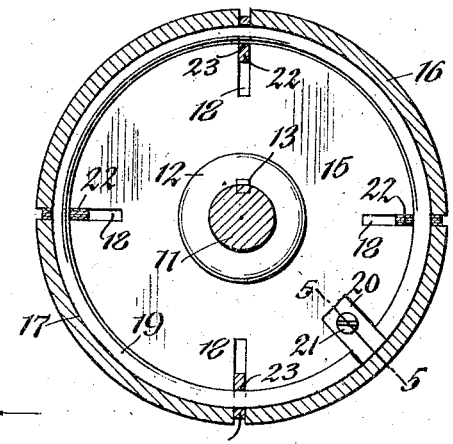
Figure 4:
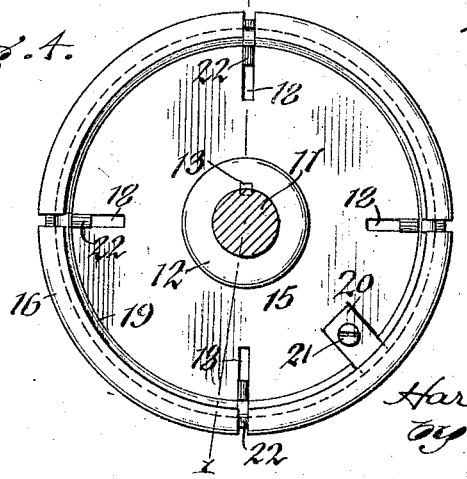
Figure 5:
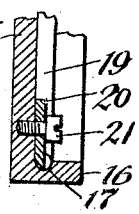
Figure 5 is a fragmentary longitudinal section taken on line 5—5, Figure 3.

The numeral 22 represents a plurality of coupling links or bars each of which may be constructed of any suitable material, preferably flexible, such as hard rubber, spring steel or copper, and has the form of a flat parallel sided bar which is provided with longitudinal slots 23 extending inwardly from opposite ends thereof. Each of these links is constructed of a plurality of comparatively thin plates of resilient material which are arranged side by side to produce a link of laminated form, as shown in Figures 2, 3 and 4, and give the same the requisite strength and flexibility.

These links are arranged in an annular row around the axis of the coupling and each link extends across the space between the two coupling heads and projects with its opposite ends into two corresponding radial slots of said heads. The slots in the link receive those portions of the retaining rings which extend across the rear side of the radial slots. The thickness of the links is equal to or nearly equal to the width of the radial slots, so that a substantially close fit is secured between these parts for maintaining the links with their flat sides in a radial position in which they are capable of being flexed the requisite extent circumferentially of the coupling while transmitting the rotary motion of one head to the other and thus cushioning the load.

The width of the slots in the links is equal to the diameter of the rings engaging therewith and thereby avoid a loose fit between the same and any rattling noise which otherwise would be liable to occur while the coupling is in operation. Due to this manner of mounting the links on the coupling heads the links are free to slide lengthwise on the rings and also rock radially thereon, thereby enabling the links to adapt themselves to any slight difference in the relative position of the coupling heads due either to the shafts being slightly out of axial alignment or tilted slightly relatively to each other. This coupling, therefore, compensates for any inaccuracy in the relation between the two shafts and still operates to flexibly transmit power from one shaft to the other by means which are of simple construction, which are not liable to get out of order and which are capable of easy and convenient replacement when worn.

I claim as my invention:

1. A flexible coupling comprising two coupling heads adapted to be mounted on two rotatable members and each provided with a seat and a slot crossing said seat, a retaining member engaging said seat and extending across the slots of each head, and a link which is arranged in the slots of both heads and engages slidingly at its opposite ends with said retaining members.

2. A flexible coupling comprising two coupling heads adapted to be mounted on two rotatable members each having a radial slot, an annular retaining member mounted on each head and extending across the slot thereof, and a coupling link having its ends arranged in the slots of said heads and provided with longitudinal slots which receive said retaining members and sliding lengthwise on said retaining members.

3. A flexible coupling comprising two coupling heads adapted to be mounted on the opposing parts of two rotatable members and each having a plurality of radial slots and an inwardly facing annular seat, a ring engaging with the seat of each head and extending across its slots, and a plurality of coupling links each having its ends arranged in corresponding slots of said heads and provided with longitudinal slots which receive the rings on the respective heads.

4. A flexible coupling comprising two coupling heads adapted to be mounted on two rotatable members and each having a plurality of radial slots and an annular flange on its rear side which is provided on its inner side with an annular groove forming an inwardly facing seat, a retaining ring engaging the seat of each head and extending across the radial slots thereof, and a plurality of coupling links each having its ends arranged in corresponding radial slots of said heads and provided with longitudinal slots which receive the adjacent parts of the respective retaining rings.

5. A flexible coupling comprising two coupling heads adapted to be mounted on two rotatable members and each having a plurality of radial slots and an annular flange on its rear side which is provided on its inner side with an annular groove forming an inwardly facing seat, a split retaining ring engaging the seat of each head and extending across the radial slots thereof, a locking block arranged between the ends of each of said retaining rings and secured to the respective head, and a plurality of coupling links each having its ends arranged in corresponding radial slots of said heads and provided with longitudinal slots which receive the adjacent parts of said retaining rings.

HARRY J. SMITH.